Nov. 28, 1933.　　J. J. TOKHEIM　　1,937,447
GAUGE CONSTRUCTION FOR TANKS
Filed Feb. 10, 1932　　2 Sheets-Sheet 1
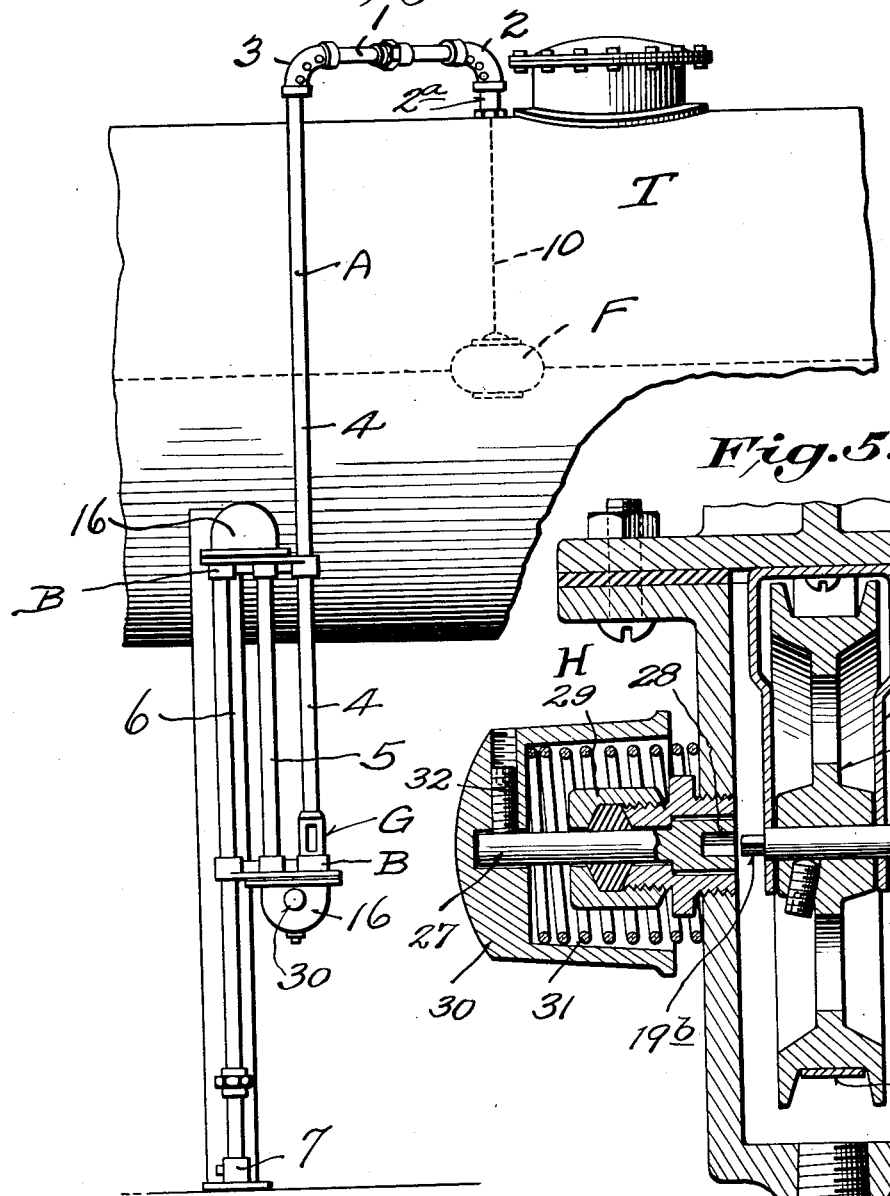
Inventor
J. J. Tokheim,
By D. P. Wilhauer
Attorney Nov. 28, 1933.     J. J. TOKHEIM     1,937,447
GAUGE CONSTRUCTION FOR TANKS
Filed Feb. 10, 1932     2 Sheets-Sheet 2
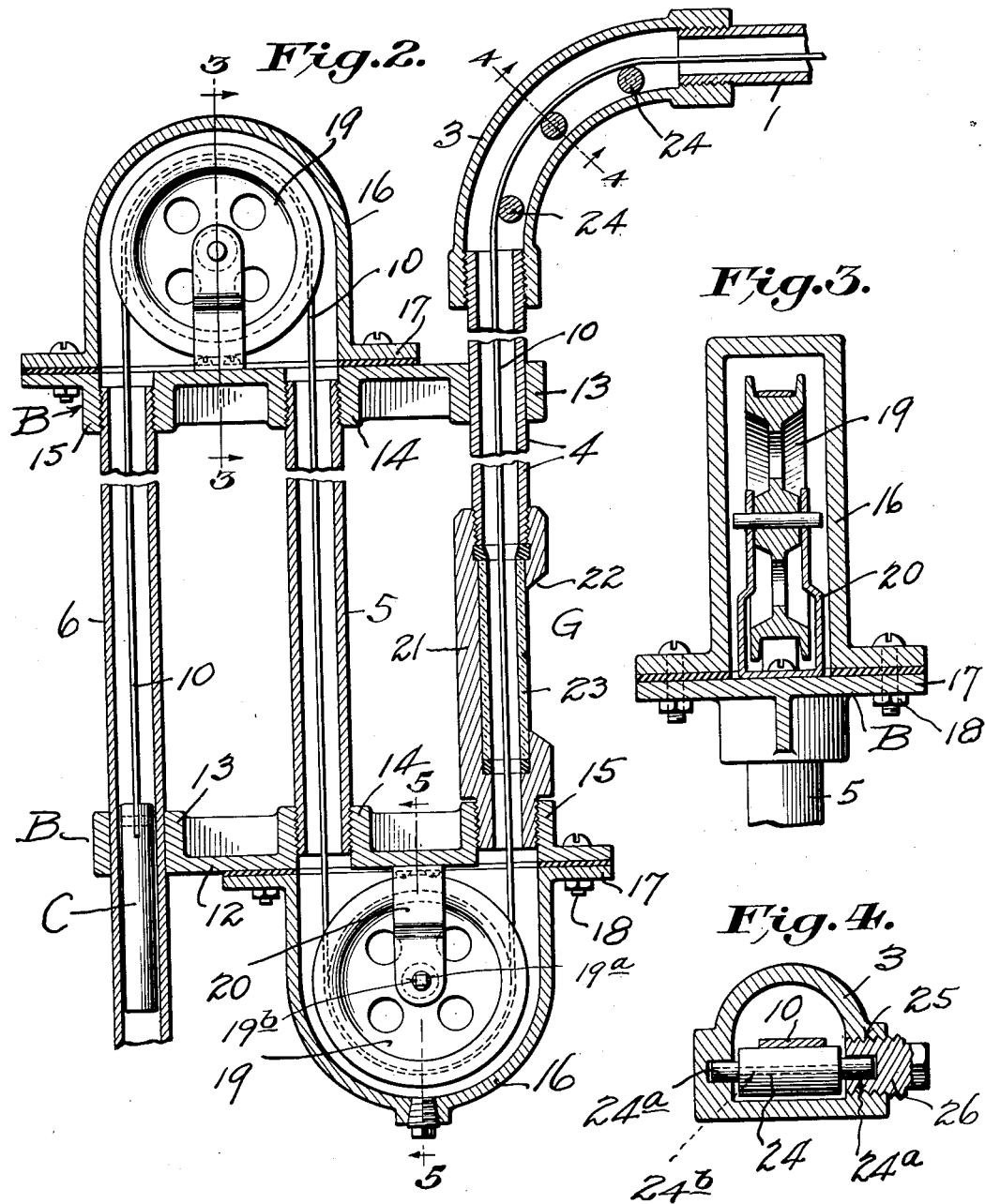

Patented Nov. 28, 1933

1,937,447

UNITED STATES PATENT OFFICE 1,937,447

GAUGE CONSTRUCTION FOR TANKS

John J. Tokheim, Cedar Rapids, Iowa

Application February 10, 1932. Serial No. 592,147

12 Claims. (Cl. 73—82)

This invention relates to float operated liquid level gauges, especially for volatile liquids and the like.

As vapor tight tanks for storing volatile liquids are fast becoming a requisite, it is equally necessary to provide a vapor tight liquid level gauge to prevent the escape of vapor except through means provided therefor. Furthermore tanks for this purpose are usually of considerable size and located underground, on elevated platforms or vertical to considerable height, and are frequently subjected to pressure and vacuum. It is thus desirable to provide a vapor tight gauge, flexible in construction to meet these varied conditions, and it is further desirable to provide a gauge which may be readily visible for inspection and reading by the inspector or gauger while standing on the ground regardless of how high the tank structure may be.

Accordingly, to that end the present invention contemplates a vapor tight gauge of simple and substantial construction having its only open connection to a point within the tank to which it is connected. In that connection the invention contemplates a suitable piping arrangement which may be connected with the tank and serves as a conduit or housing for the flexible gauge tape which is suitably calibrated to give the proper liquid level indications.

One of the objects of this invention is to provide a balanced gauge with constant tape tension having within its circuit a U bend extended to the gauger's convenient access for reading gauge tape regardless of the tank's height or location.

Another of the objects of the invention is to provide, in addition to the foregoing general object, a construction which includes a novel combination casting, which permits of easily assembling a tape guide, a pipe joiner, a sheave support and sheave hood, with easy access to tape and balance weight, in such a manner that the tape will be adequately and freely supported in balanced tension while, at the same time, the reading portion of the gauge will be located at a suitable point for the observer.

A further object of the invention is to provide a balanced liquid gauge construction including a flexible graduated tape connected to a glass float of heavy weight and large buoyancy adapted to be located within the tank and a tension weight on the other end of the tape traveling within a vapor tight conduit.

A still further object of the invention is to provide a conduit equipped with friction reducing rollers arranged in the pipe L's to permit of the free movement of the tape under the influence of the liquid in the tank.

A further object of importance to this invention is the float inertia detractor, a means of raising the float out of the period of inertia after filling or partly filling the tank, to effect instant action on the float and tape on withdrawal or lowering of the liquid level in the tank and to obtain correct reading of the amount filled into the tank.

With the above and other objects in view which will more readily appear as the nature of the invention is better understood, the same consists in the novel features of construction and combination and arrangement of parts as will be hereinafter more fully described, illustrated in the accompanying drawings and defined in the appended claims.

A preferred and practical embodiment of the invention is shown in the accompanying drawings, in which:—

Figure 1 is a view illustrating the application of the invention.

Figure 2 is an enlarged vertical sectional view of the universal sheave casting and piping associated therewith to provide a vapor tight conduit, including the tape reading U bend.

Figure 3 is a vertical cross sectional view taken on the line 3—3 of Figure 2.

Figure 4 is a detail cross sectional view taken on the line 4—4 of Figure 2.

Figure 5 is a detail cross sectional view taken on the line 5—5 in Figure 2.

Similar reference characters designate corresponding parts throughout the several figures of the drawings.

Referring to the drawings, the tank is designated generally as T and the closed vapor conduit and tape housing constituting a part of the present novel gauge construction is designated generally as A. This housing includes in its organization a horizontal tank connected section, a counter balance section, and an intermediate U-bend section for reading tape and operating the float inertia detractor at a convenient height or location.

The said horizontal tank-connected section includes the pipe 1, fitted with the elbows 2 and 3, the former being connected by pipe 2a with the tank and the latter connecting with the vertical pipe 4 of the intermediate U-bend reading section which comprises all parts between elbow 3 and pipe 6. Pipe 6 serves as a counterbalance section, required to be of a length not less than the travel of the float in the tank, plus the length of the counterweight traveling within. Pipe 6 is normally closed at the bottom by a flanged cap 7, which usually serves as a supporting leg for the gauge in general. Suitable brackets may be provided, for supporting the various pipe referred to.

Two important and distinctive features of the invention are the U-bend section for reading tape 10, and the float inertia detractor H, located at a convenient height as indicated in Figures 1, 2 and 5 and embodied in the unique combination of pipes and fittings forming the tape conduit and housing.

Another of the distinctive features of the invention resides in providing a universal sheave supporting casting B which may be used for mounting the sheaves that carry the reaches or runs of the tape 10 between the counterweight and the float, as will hereinafter more fully appear. The tape 10 is, of course, suitably graduated or calibrated and as will be observed from Figure 1 and is provided at the end thereof within the tank T with a glass float F of relatively great weight and buoyancy. As shown in Figure 2 the opposite end of the tape is provided with a counterweight C which operates within the pipe 6.

The provision of the glass float F is of particular importance in the present invention for the reason that crude oils in various parts of the country cause metals, particularly copper, to corrode. Experience with metal floats has shown the same to be objectionable because if they do not corrode or become leaky they will acquire a layer of crustacean growths which will affect the buoyancy of the float. To provide a float which will be accurate under all conditions of use it is therefore necessary to use glass or other vitreous material which will maintain a fixed buoyancy, and, because of its relatively great weight will always maintain the tape properly tensioned with reference to the balance weight. Clearly, the gauge would not be accurate if the float were inaccurate, and therefore it is extremely important to provide a float which will not only be efficient under all service conditions so far as different types of liquids are concerned, but will also maintain a steady position within the tank and be quickly responsive to changes in the fluid level.

Referring further to the universal sheave castings B, it will be observed that the same comprises a body portion 12 having a plurality of pipe receiving collars 13, 14 and 15. The collar 13 is not threaded but each of the collars 14 and 15 is interiorly threaded thereby to receive the threaded end of a pipe forming a part of the vapor tight conduit. The threaded collars 14 and 15 are adapted to be covered by a sheave hood 16 whose flanges 17 are adapted to be secured by suitable fastenings 18 directly to the body 12 of the sheave supporting casting B. Also, it will be observed from Figure 2 that the hoods 16 are adapted to house the sheaves 19 which are carried by brackets 20 also secured to the body 12 of the castings B.

The construction of the sheave mounting casting B above described permits of the use of the casting at any reverse turning point for the U turn in the conduit that it is desired to locate a sheave over which the tape 10 is to run. That is to say, the casting B may be used in the position shown in the upper half of Figure 2 or it may be inverted as shown in the lower half of Figure 2, thereby to receive the pipes 4, 5 and 6 and also to support the sheaves in such a manner that communication is provided between the pipes but communication between the conduit and the atmosphere is avoided. The provision of the unthreaded collar 13 permits of making the pipe 4 and pipe 6 of the desired length without the necessity of resorting to the use of short pipe sections to form these pipes, either of which may vary in length according to the height of the tank and the distance that it is desired to locate the gauge G.

The gauge G preferably includes a body 21 provided with a window 22 and a reading glass 23 through which the tape may be inspected and read. The arrangement described permits of locating the gauge G at a convenient location for the gauger determined by the position of the lower sheave supporting casting B and housing 16 carrying the float inertia detractor.

The elbows 2 and 3 are provided with a series of rollers 24 which may be placed therein through the opening 25 that is closed by the plug 26. The ends of the rollers are provided with the journal portions 24a which respectively fit into sockets in the interior wall of the elbow and the inner end of the plug 26. The plug 26 and the roller as well as the journal portions thereof may be provided with a lubricating passage 24b.

One of the hoods 16 carries the float inertia detractor H previously referred to. This construction is more fully illustrated in Figure 5 and its purpose is to provide a hand operated means of raising the float out of the inertia space to obtain correct reading of the contents of the tank after the same has been filled or on the other hand for obtaining an important record of any part of the contents removed after the filling of the tank. In other words, the purpose of the float inertia detractor is to permit of manual movement of the tape to lift the float out of the inertia space and put it into immediate balance created by the counterweight and tape friction.

As liquid is withdrawn from the tank under normal circumstances the float gauge operates accurately. On the other hand, as liquid is pumped into the tank the float tends to stand still until enough liquid has entered the tank to reverse the pulling weight of the float to a floating buoyancy. The counterweight will then descend and continue to hold the tape in tension.

When the tank has been partly filled and the liquid is again withdrawn, the float again stands still until enough liquid has been withdrawn to reduce the buoyancy of the float to overbalance the counterweight and the friction of the tape. The float will then continue to follow the liquid level in the tank. To insure a correct tape reading after filling the tank, it is necessary to lift the float up out of this dead space and allow it to settle to its natural level with counterweight and tape friction against it. The same operation is necessary to get important records on the tape upon withdrawal from the tank when the tank has been filled or partly filled.

Referring now more particularly to the structure of the inertial detractor it will be observed from Figure 5 of the drawings that the shaft 19a of the sheave 19 is flattened or otherwise formed as indicated at 19b to provide a key. This key is adapted to be engaged by a manual operable spring actuated clutch shaft 27 provided at one end with a socket 28 for receiving the key 19b when the shaft is moved against spring tension toward the same. The shaft 27 extends through a suitable packing nut or gland 29 and carries at its outer end a finger gripping knob 30 which is preferably hollow to receive the spring 31 and is provided with the set screw 32 or its equivalent to lock the knob to the shaft. When it is desired to actuate the sheave 19 it is simply necessary to press inwardly on the spring tension turn button or finger knob 30 which causes the socket of the shaft 27 to engage the key 19b on the sheave shaft. By turning the knob or button 30 a quarter turn to the right the tape 10 is moved to lift the float out of the inertia space. The float then descends to the ordinary liquid level determined by the counterweight C and the friction on the tape 10 and thus instantly gives the correct reading of the liquid level in the tank. The construction referred to provides manual means for adjusting the float through the medium of the tape to instantly give a correct reading of the tape and is positive assurance against sticking of the tape or the float under all conditions of use.

From the foregoing it will be apparent that the present construction provides a vapor tight housing which includes the horizontal pipe 1 communicating directly with the tank, and the counterbalance pipe 6, together with the intermediate U bend unit parts which include all parts from elbow 3 to pipe 6, as shown in the drawings. When the conduit, including the piping and parts described is complete, the tape 10 having the float F at one end and the counterweight C at the other is adapted to freely travel in the conduit over the sheaves 19 and the rollers 24 and will have no slack due to being counterbalanced. As the level of liquid in the tank T changes the float F responds and the graduations on the tape will be visible through the glass 23 of the gauge.

Without further description it is thought that the features and advantages of the invention will be readily apparent to those skilled in the art, and it will of course be understood that changes in the form, proportion and minor details of construction may be resorted to, without departing from the spirit of the invention and scope of the appended claims.

I claim:

1. A vapor tight gauge construction for liquid storage tanks including a gauge tape housing comprising, a horizontal tank connected section, a vertical counterbalance housing section, and an intermediate tape reading section comprising a plurality of vertical pipes; castings for connecting the said counterbalance housing section and the last mentioned vertical pipes of the intermediate tape reading section, rotatable members carried by the castings, housings fitted to the castings for enclosing said rotatable members, a tape passing through said housings and over said rotatable members, and a float at the end of the tape within the tank, a counterbalance at the end of the tape disposed within said counterbalance housing section.

2. A vapor tight gauge construction for liquid storage tanks including a gauge tape housing comprising, a horizontal tank connected section, a vertical counterbalance housing section, and an intermediate tape reading section comprising a plurality of short length pipes; castings for assembling and connecting the said last mentioned pipes and the counterbalance housing section, sheaves carried by the castings, sheave housings fitted to the castings, a tape passing through the housing, a float carried by the end of the tape within the tank, and a counterbalance carried by the end of the tape operating in said counterbalance housing section.

3. A vapor tight gauge construction for liquid storage tanks including a gauge tape housing comprising a horizontal pipe connected at one end to the tank, a vertical pipe connected with the other end of said horizontal pipe and forming one leg of a U-bend tape reading section, a gauge reading window in the vertical pipe, a plurality of other vertical pipes parallel with the first mentioned vertical pipe, fluid tight housings respectively connecting said first mentioned vertical pipe with certain of the other said vertical pipes and also connecting the said plurality of other vertical pipes which are parallel with the first mentioned vertical pipe, a gauge tape operating in the housing formed by said pipes, a float connected with the end of said tape operating within the tank, and a counterbalance connected with the other end of the tape.

4. In a vapor tight gauge construction for liquid storage tanks, a fluid tight gauge tape housing comprising a plurality of vertical pipes and a horizontal pipe connecting one of said vertical pipes with the tank, sheave supporting castings for connecting certain of said pipes, said castings being adapted to be used in reversed positions to provide sheave supports, a sheave mounted on each casting, a housing for the sheave also mounted on each casting, a fluid tight gauge reading window in one of the vertical pipes, a gauge tape operating in said gauge tape housing, a float connected with one end of said tape and a counterbalance connected with the other end thereof.

5. A vapor tight gauge construction for liquid storage tanks comprising a tape housing including a horizontal tank connected section, a vertical counterbalance housing section closed at one end, and an intermediate tape reading section respectively jointed with the counterbalance housing section and the tank connected section, said intermediate tape reading section including a relatively short pipe section threaded at each end, sheave supporting castings each having a centrally threaded opening to receive the threaded ends of said last mentioned pipe, said castings each having other openings at opposite sides of said centrally threaded openings to receive other pipe sections, sheave supports mounted adjacent said centrally threaded openings, sheaves on said supports, housings for said sheaves attached to said sheave castings, a gauge reading window in one of the vertical pipe sections, a gauge tape movably supported in the said gauge housing, a float connected with one end of the tape, and a counterbalance connected with the other end of said tape.

6. A vapor tight gauge construction for liquid storage tanks including a gauge tape housing comprising, a horizontal tank connected section, a vertical counterbalance housing section, and an intermediate tape reading section comprising a plurality of vertical pipes; castings for connecting the said counterbalance housing section and the last mentioned vertical pipes of the intermediate tape reading section, rotatable members carried by the castings, housings fitted to the castings for enclosing said rotatable members, a tape passing through said housings and over said rotatable members, a float at the end of the tape within the tank, a counterbalance at the end of the tape disposed within said counterbalance housing section, and a float inertia detractor device fitted to one of said housings, said device including manually operated means adapted to engage one of the said rotatable members to permit manual movement thereof to shift the tape.

7. In a vapor tight gauge construction for liquid storage tanks, a fluid tight gauge tape housing, comprising a plurality of vertical pipes, and a horizontal pipe connecting one of said vertical pipes with the tank; sheave supporting castings for connecting certain of said pipes, said castings being adapted to be mounted in reversed positions to provide sheave supports, a sheave mounted on each casting, a housing for the sheave also mounted on each casting, a float inertia detractor connected to one of the sheave housings and having means for detachably engaging with the sheave therein, a fluid tight gauge reading window in one of the vertical pipes, a gauge tape operating in said gauge tape housing, a float connected with one end of the tape, and a counterbalance connected with the other end of said tape.

8. A float operated liquid level gauge construction for liquid storage tanks including a gauge tape housing, sheaves mounted in the housing, a gauge tape operating in the housing and over said sheaves, a float connected with one end of the tape, a counterbalance connected with the other end of the tape, a float inertia detractor device carried by the housing and adapted to be manually moved to engage one of the sheaves whereby the latter may be moved to shift the gauge tape and cause the float to adjust itself to the liquid level in the tank.

9. A gauge construction for liquid storage tanks including a vapor tight gauge tape housing communicating with the tank at one end and closed at the other, said tape housing including a U-shaped section having a gauge reading opening therein covered by a transparent medium, rotatable members in the housing, a tape in the housing passing over said members, a float at the end of the tape within the tank, a counterbalance connected with the other end of the tape and arranged adjacent the closed end of the latter, and means shiftably mounted in said housing for engaging one of said rotatable members whereby the same may be manually manipulated to shift the tape in engagement therewith to cause the float to seek the liquid level in the tank.

10. A gauge construction for liquid storage tanks including a vapor tight tape housing connected at one end to the tank and closed at the other end whereby it is not subjected to changes of pressure and vacuum, said tape housing including a U-section having the bend thereof located convenient to a point for manual inspection, rotatable members within the housing, a tape passing over said members, a float connected with the end of the tape within the tank, a counterbalance connected with the other end of the tape and located in the housing, a tape reading window in the housing, and means carried by the housing for manually engaging one of said rotatable members to cause the same to be shifted and permit the float to seek the level of the liquid in the tank.

11. In a gauge for liquid storage tanks the combination with a housing, a measuring tape movably supported in the housing, a float connected with one end of the tape, and a counterbalance connected with the other end thereof, of means accessible from the exterior of the housing for manually shifting said tape.

12. In a gauge for liquid storage tanks the combination with a housing, a measuring tape movably supported in the housing, a float connected with one end of the tape, and a counterbalance connected with the other end thereof, of means accessible from the exterior of the housing for manually shifting said tape, said means including a knob, means for normally holding the knob in inoperative position, and means operative when the knob is shifted to permit manual shifting of the tape.

JOHN J. TOKHEIM.